United States Patent [19]
Miura

[11] Patent Number: 4,474,278
[45] Date of Patent: Oct. 2, 1984

[54] CLOSED WET CLUTCH HAVING A BREATHER
[75] Inventor: Hideki Miura, Hirakata, Japan
[73] Assignee: Kubushiki Kaisha Daikin Seisakusho, Osaka, Japan
[21] Appl. No.: 372,001
[22] Filed: Apr. 26, 1982
[30] Foreign Application Priority Data
  Apr. 24, 1981 [JP] Japan .................. 56-60230[U]
[51] Int. Cl.³ .................................... F16D 13/74
[52] U.S. Cl. ......................... 192/113 B; 192/70.12; 192/112
[58] Field of Search ............... 192/70.12, 112, 113 B; 188/264 P

[56] References Cited
U.S. PATENT DOCUMENTS

| | | | |
|---|---|---|---|
| 2,750,009 | 6/1956 | Pohl | 188/264 P |
| 3,610,384 | 10/1971 | Borck | 192/113 B |
| 3,768,613 | 10/1973 | Brunner | 192/113 B |
| 3,921,778 | 11/1975 | Sugiura et al. | 192/113 B |
| 3,964,587 | 6/1976 | Wang et al. | 192/113 B |
| 4,315,565 | 2/1982 | Low | 192/113 B |
| 4,321,990 | 3/1982 | Koch | 192/12 A X |

FOREIGN PATENT DOCUMENTS 125889 12/1931 Austria ........................ 192/70.12

Primary Examiner—Rodney H. Bonck
Attorney, Agent, or Firm—Armstrong, Nikaido Marmelstein & Kubovcik

[57] ABSTRACT

This invention relates to a breathing device of a wet clutch, which lets atmospheric air into a clutch case only when a pressure inside the clutch case becomes negative pressure, said closed wet clutch having a forced lubrication system pumping oil from a tank through a pump to a spray nozzle and a discharge oil system conveying oil from a fixed suction nozzle, which opens to oil pressurized onto an inner peripheral surface of the clutch case when the case rotates to the tank.

6 Claims, 4 Drawing Figures

CLOSED WET CLUTCH HAVING A BREATHER

FIELD OF THE INVENTION

This invention relates mainly to a breathing device of closed wet clutch which is equipped in between a vehicle prime mover and a transmission.

SUMMARY OF THE INVENTION

An object of the invention is to prevent incomplete disengagement of a clutch disc due to an increase in oil quantity in a clutch case.

In order to accomplish the above object, in this invention a breather, which admits atmospheric air into a clutch case only when the pressure inside the clutch case becomes a negative pressure, is equipped in a closed wet clutch. It has a forced lubrication system providing oil from a tank through a pump to a spray nozzle and a discharging oil system sucking oil through a fixed suction nozzle, which has an opening proximal to oil forced onto an inner peripheral surface of the clutch case during rotation, and conveying the oil, to the tank.

DETAILED DESCRIPTION OF THE INVENTION

Figure 1:
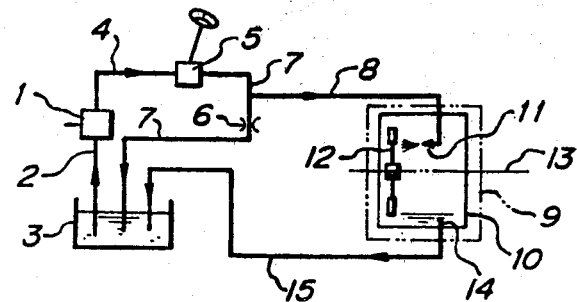
FIG. 1 is a circuit diagram showing a general forced circulation system.

FIG. 1 shows a general circuit of a forced circulation system of oil, in which a suction port of a pump 1 driven by a prime mover (not shown in the figure) is interconnected through an oil passage 2 to an oil tank 3, a discharge port is interconnected through an oil passage 4 to a steering valve 5, and a discharge port of the steering valve 5 is interconnected through oil passage 7 having an orifice 6 on its way to the oil tank 3. A bypass 8 branches away from the oil passage 7 passing between the steering valve 5 and the orifice 6, and then the bypass 8 is interconnected with a spray nozzle 11 in a clutch case 10 surrounded by a clutch housing 9. The clutch case 10 is a member directly connected to an output shaft of the prime mover, and rotates inside the clutch housing 9. A clutch disc 12 in the clutch case 10 spline fits onto an output shaft 13, and is a member which engages and disengages with the clutch case 10. The spray nozzle 11 opens toward a frictional surface of the clutch disc 12. A suction nozzle 14 is provided in the clutch case 10 in order to suck out oil which is forced against the inner peripheral surface of the clutch case 10 by centrifugal force, the suction nozzle 14 being interconnected through an oil passage 15 to the oil tank 3. An oil passage passes from the oil tank 3 through the pump 1 to the spray nozzle 11 to form the forced lubrication system, and the oil passage 15 passes from the suction nozzle 14 to the oil tank 15 to form the discharging oil system.

Figure 2:
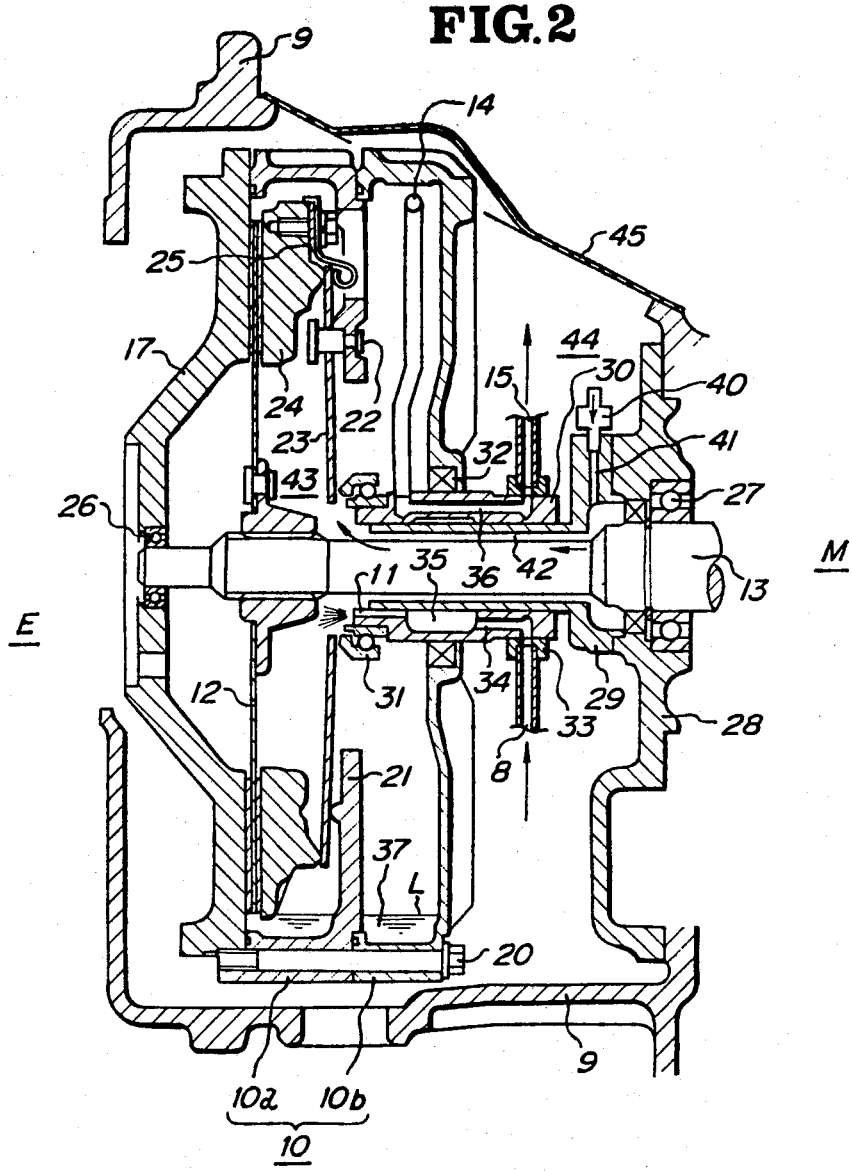
FIG. 2 is a longitudinal section of an embodiment of the clutch of the instant invention.

FIG. 2 shows a detailed construction inside the clutch housing, in which flywheel 17 contacts clutch disc 12 in response to applied pressure and is fixed to the output shaft (not shown in the figure) of the prime mover; and a first clutch case 10a and second clutch case 10b, in turn from the flywheel 17 side, are fastened to the flywheel 17 by means of a plurality of bolts 20. A diaphragm spring 23 is supported on an inward flange 21 of the first clutch case 10a through a plurality of pins 22. An outer perphery of the diaphragm spring 23 is pressed against a pressure plate 24, and the pressure plate 24 presses the clutch disc 12 against the flywheel 17 through the means of elastic force of the diaphragm spring 23. The pressure plate 24 is interconnected with the first clutch case 10a through a strap 25 extending radially. The output shaft 13 being spline fit into the clutch disc 12 is supported by the flywheel 17 and a transmission cover 28 through bearings 26 and 27, and a sleeve retainer 29 is fixed to the transmission cover 28 concentrically with the output shaft 13 by a plurality of bolts (not shown in the figure). A sleeve 30 fitting onto the sleeve retainer 29 provides a release bearing 31 at its end nearest clutch disc 12. oil seal 32 fixed to an inner periphery of the second clutch case 10b contacts an outer peripheral surface of a longitudinally middle portion of the sleeve 30 allowing sleeve 30 to slide freely in the axial direction. The sleeve 30 has a fork gudgeon 33 formed integrally therewith and serving also as a pipe joint on a projecting part near to the transmission side M from the oil seal 32. Pipes forming the bypass 8 and the oil passage 15 are connected to the fork gudgeon 33. A clutch release fork (not shown in the figure) fits on the gudgeon 33 on both sides thereof, thus sandwiching the output shaft. The sleeve 30 can, therefore, only slide freely in the axial direction on the sleeve retainer 29. The bypass 8 is interconnected through oil passages 34 and 35 in the sleeve 30 to the spray nozzle 11, and the oil passage 15 is interconnected through an oil passage 36 in the sleeve 30 to the suction nozzle 14. The nozzle 14 is formed by a pipe extending radially outward from the sleeve 30; its top end opens in the vicinity of the inner peripheral surface of the second clutch case 10b in the direction opposite to the rotational direction of the clutch case 10b. Nozzle 14 is situated to be radially farther outward than an oil level L of an oil 37 which is pressurized onto the inner peripheral surface of the clutch case by centrifugal force during rotation.

In FIG. 1, oil pressurized in the pump 1 circulates through the steering valve 5 and the oil passage 7 to the oil tank. A part of it, however, is sent through the bypass 8 at the upstream side of the orifice 6 to the oil passages 34 and 35 in the sleeve, and is sprayed from the spray nozzle 11 at the clutch disc 12 to supply with oil both frictional surfaces between the clutch disc 12 and the flywheel 17 and pressure plate 24. The sprayed oil accumulating on the inner peripheral surface of the clutch case is pressurized by means of the centrifugal force generated by rotation of the clutch cases 10a and 10b, squeezing into the suction nozzle 14, and thus being naturally sent to the oil tank 3 at the outside of the clutch housing through the oil passages 36 and 15.

Figure 3:
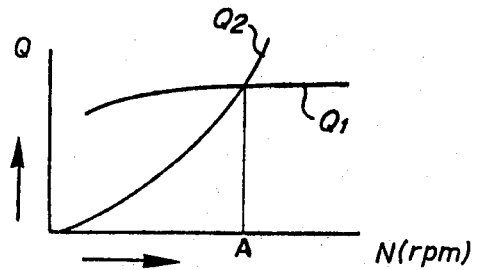
FIG. 3 is a diagramatic chart showing the relation between a flow and a clutch r.p.m.
Figure 4:
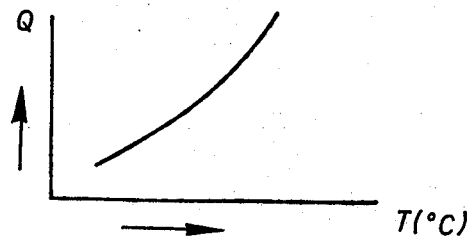
FIG. 4 is a diagramatic chart showing the relation between a flow and an oil temperature.

As mentioned above, in case of the closed wet clutch in which oil is pumped by the pump 1 and returned from the suction nozzle 14 in the clutch case to the tank 3, it is common that the oil supply Q becomes approximately constant regardless of the clutch rotational speed N because the pump 1 is driven by the prime mover (Q1 in FIG. 3). On the contrary, the suction of oil from the suction nozzle 14 is influenced by the clutch rotational speed and its flow characteristics becomes as like Q2 in FIG. 3. Further, the oil suction from the suction nozzle 14 is considerably influenced by oil temperature T as shown in FIG. 4, and the following troubles have been experienced:

(1) In case of a positive pressure preventive breathing device attached:

At a low temperature and a low rotational speed (below the speed A in FIG. 3), the oil suction from the nozzle becomes smaller than the oil supply to cause repletion of oil in the clutch case within a short time, the incomplete disengagement of the clutch, and further ejection of oil from the case.

(2) In case of no breathing device attached:

Owing to a rise in inside pressure by means of the forced lubrication, oil discharge from the suction nozzle is accelerated to cause no repletion of oil within a short time even at a low temperature and a low rotational speed, and little trouble has been experienced in the practical use. In the case when the rotational speed is abruptly reduced from a high-speed range to a low-speed ronge, however, the trouble has arisen that the oil quantity in the clutch case increases influenced by a negative pressure in the clutch at a high-speed (caused by a large nozzle suction capacity), the oil level L moves toward the output shaft 13 side, an outer periphery of the clutch disc 12 soaks in the oil, and the disengagement of the clutch becomes incomplete.

A feature of the present invention is to provide a breathing device, which lets external air into the clutch case inside only when the pressure inside the clutch case becomes negative, in order to solve the abovementioned conventional troubles experienced in the closed wet clutch. In the embodiment as shown in FIG. 2, a breather 40 which is actuated only in negative pressure is attached to the top of the sleeve retainer 29, and the breather 40 is interconnected to a space 43 in the clutch case through a passage 41 in the sleeve retainer 29 and an annular passage 42 which is formed between the sleeve retainer 29 and the output shaft 13. Pressures in the passages 41 and 42 are the same as those of the space 43 in the clutch case and space 44 in the clutch housing above the breather 40 opens to the atmosphere through openings (not shown in the figure) provided on a cover etc., so that the breather 40 can suck atmosphere in the direction of the arrow only when the pressure in the clutch case becomes negative. The breather 40 is a conventional check valve such as of the ball type, the lead type, or the rubber-cap-with-slit type.

As mentioned above in this invention, the breather 40 having the reverse function as compared with a conventional breather is attached to sleeve retainer 29. The trouble, such as the insufficient oil suction as compared with the oil supply at a low temperature and a low rotational speed to cause the repletion of oil in the clutch case, can therefore be avoided in the case of using a conventional positive-pressure-preventive-breather; and further the trouble, such as the repletion of oil when the speed is abruptly reduced from a high-speed range to a low-speed range, can securely be prevented in case of using no breather. Since the breather 40 functioning on a negative pressure opposite to a conventional breather is used, the inside pressure increases during running to increase the discharged quantity of oil from the suction nozzle 14 while restricting the sprayed oil quantity from the spray nozzle 11. Accordingly, an increase in oil quantity inside the clutch case can be restricted and an increase in negative pressure inside the clutch case be restricted even in case of a large nozzle suction capacity at a high-speed, so that the possibility of repletion of oil can be eliminated even when the rotational speed is abruptly reduced from a high-speed range to a low-speed range. Thus, the incomplete disengagement of the clutch due to soaking of the clutch disc 12 in oil can be prevented over the entire running range.

What is claimed is:

1. A breather and circulation system in a closed, wet clutch, comprising:

breathing means for letting atmospheric pressure into a clutch case only when a negative pressure is present inside said clutch case and for keeping a positive pressure within said clutch case, said breathing means including a passage means for connecting the atmospheric pressure to the interior of said clutch case, said passage means including a one way check valve disposed outside of said clutch case in a clutch housing to regulate the flow through said passage means;

a pressure system means for providing pressurized oil from a tank to the clutch through a spray nozzle; and a discharging means for sucking up oil in the clutch from a fixed suction nozzle, said nozzle being open to oil forced to an inner peripheral surface of the clutch case during rotation, said discharging means returing the oil to said tank.

2. The breather and circulation system of claim 1, wherein said valve means is fixed to a sleeve retainer supporting a release sleeve of the clutch.

3. The breather and circulation system of claim 1, wherein said passage means includes an annular passage between the sleeve retainer and an output shaft.

4. The breather and circulation system of any one of claims 1 to 3, wherein said check valve comprises a ball check valve.

5. The breather and circulation system of any one of claims 1 to 3, wherein said check valve comprises a lead check valve.

6. The breather and circulation system of any one of claims 1 to 3, wherein said check valve comprises a rubber-cap-with-slit check valve.

* * * * *